United States Patent
Cooper (10) Patent No.: US 9,501,580 B2
(45) Date of Patent: Nov. 22, 2016

(54) METHOD AND APPARATUS FOR AUTOMATED SELECTION OF INTERESTING CONTENT FOR PRESENTATION TO FIRST TIME VISITORS OF A WEBSITE

(71) Applicant: Pearl.com LLC, San Francisco, CA (US)

(72) Inventor: Edwin Cooper, Oakland, CA (US)

(73) Assignee: Pearl.com LLC, San Francisco, CA (US)

(*) Notice: Subject to any disclaimer, the term of this patent is extended or adjusted under 35 U.S.C. 154(b) by 606 days.

(21) Appl. No.: 13/946,989

(22) Filed: Jul. 19, 2013

(65) Prior Publication Data

US 2013/0304749 A1    Nov. 14, 2013

Related U.S. Application Data

(63) Continuation-in-part of application No. 13/464,230, filed on May 4, 2012.

(51) Int. Cl.
G06F 17/30    (2006.01)

(52) U.S. Cl.
CPC ..... *G06F 17/3089* (2013.01); *G06F 17/30867* (2013.01)

(58) Field of Classification Search
CPC ................. G06F 17/30867; G06F 17/3089; G06F 17/30861; G06F 17/30864
See application file for complete search history.

(56) References Cited

U.S. PATENT DOCUMENTS

| | | | |
|---|---|---|---|
| 5,384,703 | A | 1/1995 | Withgott et al. |
| 5,566,302 | A | 10/1996 | Khalidi et al. |
| 5,642,520 | A | 6/1997 | Takeshita et al. |
| 5,918,240 | A | 6/1999 | Kupiec et al. |
| 5,937,422 | A | 8/1999 | Nelson et al. |
| 5,960,383 | A | 9/1999 | Fleischer |
| 6,018,543 | A | 1/2000 | Blois et al. |
| 6,029,195 | A | 2/2000 | Herz |
| 6,144,672 | A | 11/2000 | Brauner |
| 6,172,675 | B1 | 1/2001 | Ahmad et al. |
| 6,173,279 | B1 | 1/2001 | Levin et al. |
| 6,212,494 | B1 | 4/2001 | Boguraev |
| 6,223,165 | B1 | 4/2001 | Lauffer |
| 6,289,304 | B1 | 9/2001 | Grefenstette |
| 6,629,097 | B1 | 9/2003 | Keith |
| 6,638,317 | B2 | 10/2003 | Nakao |

(Continued)

FOREIGN PATENT DOCUMENTS

| | | |
|---|---|---|
| CN | 101320374 A | 12/2008 |
| JP | 2004086583 A | 3/2004 |

(Continued)

OTHER PUBLICATIONS

Schönhofen, Peter. "Identifying document topics using the Wikipedia category network." Web Intelligence and Agent Systems: An International Journal 7.2 (2009): 195-207.*

(Continued)

*Primary Examiner* — Nan Hutton
(74) *Attorney, Agent, or Firm* — Zilka-Kotab, PC (57) ABSTRACT

Embodiments of the present invention provide systems and methods for automatically identifying content that may be interesting visitors of a website in the absence of any information on the visitors' interest or preferences.

13 Claims, 6 Drawing Sheets

(56) References Cited

U.S. PATENT DOCUMENTS

| | | |
|---|---|---|
| 6,754,654 B1 | 6/2004 | Kim et al. |
| 6,823,325 B1 | 11/2004 | Davies et al. |
| 6,871,199 B1 | 3/2005 | Binnig et al. |
| 6,963,830 B1 | 11/2005 | Nakao |
| 7,013,325 B1 | 3/2006 | Vivian et al. |
| 7,058,626 B1 | 6/2006 | Pan et al. |
| 7,146,128 B2 | 12/2006 | Okubo |
| 7,146,358 B1 | 12/2006 | Gravano et al. |
| 7,200,808 B1 | 4/2007 | Nagao |
| 7,209,908 B2 | 4/2007 | Li et al. |
| 7,289,982 B2 | 10/2007 | Saito et al. |
| 7,376,893 B2 | 5/2008 | Chen et al. |
| 7,454,393 B2 | 11/2008 | Horvitz et al. |
| 7,516,113 B2 | 4/2009 | Horvitz et al. |
| 7,672,831 B2 | 3/2010 | Todhunter et al. |
| 7,739,215 B2 | 6/2010 | Horvitz et al. |
| 7,783,622 B1* | 8/2010 | Vandermolen .... G06F 17/30867 707/708 |
| 7,831,688 B2 | 11/2010 | Linyard et al. |
| 7,962,326 B2 | 6/2011 | Tsourikov et al. |
| 8,005,665 B2 | 8/2011 | Chaney et al. |
| 8,046,472 B2 | 10/2011 | Kumar |
| 8,150,750 B2 | 4/2012 | Ray |
| 8,250,018 B2 | 8/2012 | Wong et al. |
| 8,280,888 B1 | 10/2012 | Bierner et al. |
| 8,332,394 B2 | 12/2012 | Fan et al. |
| 8,392,360 B1 | 3/2013 | Dicker et al. |
| 8,457,979 B2 | 6/2013 | Kurtzig et al. |
| 8,463,648 B1 | 6/2013 | Bierner et al. |
| 8,463,791 B1 | 6/2013 | Bierner et al. |
| 8,473,499 B2 | 6/2013 | Song et al. |
| 8,516,077 B2 | 8/2013 | Linyard et al. |
| 8,606,739 B2 | 12/2013 | Apacible et al. |
| 8,655,866 B1 | 2/2014 | Provine et al. |
| 8,732,222 B2 | 5/2014 | Horvitz et al. |
| 8,738,617 B2 | 5/2014 | Brown et al. |
| 8,954,358 B1* | 2/2015 | Zhang ............ G06K 9/6292 382/225 |
| 9,275,038 B2 | 3/2016 | Bierner et al. |
| 2001/0021934 A1 | 9/2001 | Yokoi |
| 2002/0010574 A1 | 1/2002 | Tsourikov et al. |
| 2002/0023144 A1 | 2/2002 | Linyard et al. |
| 2002/0065857 A1 | 5/2002 | Michalewicz et al. |
| 2002/0087314 A1 | 7/2002 | Fischer et al. |
| 2002/0087496 A1 | 7/2002 | Stirpe et al. |
| 2002/0116176 A1 | 8/2002 | Tsourikov et al. |
| 2002/0184206 A1 | 12/2002 | Evans |
| 2003/0028525 A1 | 2/2003 | Santos et al. |
| 2003/0130837 A1 | 7/2003 | Batchilo et al. |
| 2003/0140037 A1 | 7/2003 | Deh-Lee |
| 2003/0144895 A1 | 7/2003 | Aksu et al. |
| 2003/0172368 A1 | 9/2003 | Alumbaugh et al. |
| 2003/0200079 A1 | 10/2003 | Sakai |
| 2004/0006560 A1 | 1/2004 | Chan et al. |
| 2004/0049499 A1 | 3/2004 | Nomoto et al. |
| 2004/0083224 A1 | 4/2004 | Yoshida |
| 2004/0158337 A1 | 8/2004 | Forest |
| 2004/0205448 A1 | 10/2004 | Grefenstette et al. |
| 2005/0055231 A1 | 3/2005 | Lee |
| 2005/0086290 A1 | 4/2005 | Joyce et al. |
| 2005/0131874 A1 | 6/2005 | Verbitsky |
| 2005/0182743 A1 | 8/2005 | Koenig |
| 2005/0266387 A1 | 12/2005 | Rossides |
| 2005/0278314 A1 | 12/2005 | Buchheit |
| 2006/0036563 A1 | 2/2006 | Wu |
| 2006/0041424 A1 | 2/2006 | Todhunter et al. |
| 2006/0106788 A1 | 5/2006 | Forrest |
| 2006/0149555 A1 | 7/2006 | Fabbrizio et al. |
| 2006/0167864 A1 | 7/2006 | Bailey et al. |
| 2006/0287970 A1 | 12/2006 | Chess et al. |
| 2006/0294037 A1 | 12/2006 | Horvitz et al. |
| 2007/0005564 A1 | 1/2007 | Zehner |
| 2007/0022109 A1 | 1/2007 | Imielinski et al. |
| 2007/0094006 A1 | 4/2007 | Todhunter et al. |
| 2007/0124266 A1 | 5/2007 | Hearing et al. |
| 2007/0143238 A1 | 6/2007 | Kochunni et al. |
| 2007/0160970 A1 | 7/2007 | Kaplan |
| 2007/0203863 A1 | 8/2007 | Gupta et al. |
| 2007/0239874 A1 | 10/2007 | Lazaridis et al. |
| 2007/0271256 A1 | 11/2007 | Chang et al. |
| 2008/0027783 A1 | 1/2008 | Hughes et al. |
| 2008/0064018 A1 | 3/2008 | Griffin |
| 2008/0077054 A1 | 3/2008 | Feuer et al. |
| 2008/0126280 A1 | 5/2008 | Liu et al. |
| 2008/0147741 A1 | 6/2008 | Gonen et al. |
| 2008/0160490 A1 | 7/2008 | Gomes et al. |
| 2008/0215976 A1 | 9/2008 | Bierner et al. |
| 2008/0243539 A1 | 10/2008 | Barish et al. |
| 2008/0270169 A1 | 10/2008 | Kibar et al. |
| 2008/0311934 A1 | 12/2008 | Soderstrom |
| 2009/0055384 A1 | 2/2009 | Jain et al. |
| 2009/0063463 A1 | 3/2009 | Turner et al. |
| 2009/0112912 A1 | 4/2009 | Schimmel et al. |
| 2009/0162824 A1 | 6/2009 | Heck |
| 2009/0177529 A1 | 7/2009 | Hadi |
| 2009/0192966 A1 | 7/2009 | Horvitz et al. |
| 2009/0204426 A1 | 8/2009 | Thorne et al. |
| 2009/0276419 A1 | 11/2009 | Jones et al. |
| 2010/0048229 A1 | 2/2010 | Rizzi |
| 2010/0057569 A1 | 3/2010 | Cantelmo et al. |
| 2010/0161785 A1* | 6/2010 | Xue ............... G06F 17/30867 709/224 |
| 2010/0191686 A1 | 7/2010 | Wang et al. |
| 2010/0217603 A1 | 8/2010 | Hammond et al. |
| 2010/0235311 A1* | 9/2010 | Cao ............... G06F 17/30867 706/46 |
| 2011/0004588 A1 | 1/2011 | Leitersdorf et al. |
| 2011/0040592 A1 | 2/2011 | Kurtzig et al. |
| 2011/0040662 A1 | 2/2011 | Kurtzig |
| 2011/0040694 A1 | 2/2011 | Kurtzig et al. |
| 2011/0041173 A1 | 2/2011 | Kurtzig et al. |
| 2011/0078167 A1 | 3/2011 | Sundaresan et al. |
| 2011/0131210 A1 | 6/2011 | Bierner |
| 2011/0131283 A1 | 6/2011 | Canning et al. |
| 2012/0095978 A1 | 4/2012 | Levin et al. |
| 2012/0116844 A1 | 5/2012 | Menich et al. |
| 2012/0130910 A1 | 5/2012 | Al-Alami |
| 2012/0131033 A1 | 5/2012 | Bierner |
| 2012/0185888 A1 | 7/2012 | Eyer et al. |
| 2012/0197813 A1 | 8/2012 | Kurtzig et al. |
| 2012/0197820 A1 | 8/2012 | Kurtzig et al. |
| 2012/0303356 A1 | 11/2012 | Boyle et al. |
| 2013/0041921 A1 | 2/2013 | Cooper et al. |
| 2013/0124532 A1 | 5/2013 | McQuarrie |
| 2013/0132308 A1 | 5/2013 | Boss et al. |
| 2013/0151236 A1* | 6/2013 | Iofinov ........... G06F 17/30327 704/9 |
| 2013/0166282 A1* | 6/2013 | Ridge ............. G06F 17/2785 704/9 |
| 2013/0254153 A1 | 9/2013 | Marcheret |
| 2013/0268319 A1 | 10/2013 | Palombo |
| 2013/0290225 A1 | 10/2013 | Kamath et al. |
| 2013/0290342 A1 | 10/2013 | Cooper et al. |
| 2013/0295546 A1 | 11/2013 | Bierner et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0311476 A1 | 11/2013 | Bierner |
| 2013/0311903 A1 | 11/2013 | Zadeh et al. |
| 2014/0003652 A1 | 1/2014 | Fedorovskaya et al. |
| 2014/0074826 A1 | 3/2014 | Cooper et al. |
| 2014/0114986 A1 | 4/2014 | Bierner et al. |
| 2014/0120513 A1* | 5/2014 | Jenkins ........... G06F 17/27 434/362 |
| 2014/0136567 A1* | 5/2014 | Bhalotia .......... G06F 17/3064 707/771 |
| 2014/0156365 A1 | 6/2014 | Porter et al. |

FOREIGN PATENT DOCUMENTS

| | | |
|---|---|---|
| WO | 2008077054 A1 | 6/2008 |
| WO | 2011019852 A1 | 2/2011 |

(56) References Cited

FOREIGN PATENT DOCUMENTS

OTHER PUBLICATIONS

Bischoff, Kerstin, et al. "Can all tags be used for search?." Proceedings of the 17th ACM conference on Information and knowledge management. ACM, 2008.*
Anick, Peter G., and Suresh Tipirneni. "The paraphrase search assistant: terminological feedback for iterative information seeking." Proceedings of the 22nd annual international ACM SIGIR conference on Research and development in information retrieval. ACM, 1999.*
Non-Final Office Action from U.S. Appl. No. 13/464,230, dated Jul. 9, 2015.
Final Office Action from U.S. Appl. No. 13/464,269, dated Aug. 11, 2015.
Final Office Action from U.S. Appl. No. 13/464,287, dated Aug. 10, 2015.
Non-Final Office Action from U.S. Appl. No. 13/946,982, dated Jun. 29, 2015.
Sferra, "Customer Service Webpage" http://www.sferra.com/content/100/customer-service.html, Oct. 10, 2011, pp. 1-4.
Sears Brands LLC, "Customer Service Webpage" http://www.sears.com/shc/s/nb_10153_12605_NB_CSHome, Mar. 14, 2012, pp. 1-2.
Bierner et al., U.S. Appl. No. 13/946,982, filed Jul. 19, 2013.
Non-Final Office Action from U.S. Appl. No. 13/946,982, dated Jul. 15, 2014.
Final Office Action from U.S. Appl. No. 13/946,982, dated Dec. 8, 2014.
Advisory Action from U.S. Appl. No. 13/946,982, dated Mar. 23, 2015.
Final Office Action from U.S. Appl. No. 12/854,838, dated Mar. 20, 2015.
Final Office Action from U.S. Appl. No. 12/854,846, dated Apr. 7, 2015.
Kurtzig, A. P., U.S. Appl. No. 12/854,846, filed Aug. 11, 2010.
Non-Final Office Action from U.S. Appl. No. 12/854,846, dated Oct. 11, 2011.
Final Office Action from U.S. Appl. No. 12/854,846, dated Jun. 6, 2012.
Advisory Action from U.S. Appl. No. 12/854,846, dated Aug. 30, 2012.
Non-Final Office Action from U.S. Appl. No. 12/854,846, dated Dec. 18, 2014.
Kurtzig et al., U.S. Appl. No. 12/854,838, filed Aug. 11, 2010.
Non-Final Office Action from U.S. Appl. No. 12/854,838, dated Feb. 15, 2012.
Final Office Action from U.S. Appl. No. 12/854,838, dated Jul. 20, 2012.
Non-Final Office Action from U.S. Appl. No. 12/854,838, dated Oct. 2, 2014.
Kurtzig et al., U.S. Appl. No. 13/439,728, filed Apr. 4, 2012.
Non-Final Office Action from U.S. Appl. No. 13/439,728, dated Jul. 18, 2012.
Final Office Action from U.S. Appl. No. 13/439,728, dated Nov. 6, 2012.
Advisory Action from U.S. Appl. No. 13/439,728, dated Jan. 11, 2013.
Notice of Allowance from U.S. Appl. No. 13/439,728, dated Feb. 5, 2013.
Bierner et al., U.S. Appl. No. 13/464,167, filed May 4, 2012.
Non-Final Office Action from U.S. Appl. No. 13/464,167, dated Aug. 28, 2012.
Notice of Allowance from U.S. Appl. No. 13/464,167, dated Apr. 18, 2013.
Bierner et al., U.S. Appl. No. 13/464,196, filed May 4, 2012.
Notice of Allowance from U.S. Appl. No. 13/464,196, dated Aug. 13, 2012.
Bierner et al., U.S. Appl. No. 13/598,450, filed Aug. 29, 2012.
Notice of Allowance from U.S. Appl. No. 13/598,450, dated Feb. 26, 2013.
Bierner et al., U.S. Appl. No. 13/464,230, filed May 4, 2012.
Non-Final Office Action from U.S. Appl. No. 13/464,230, dated Oct. 16, 2013.
Final Office Action from U.S. Appl. No. 13/464,230, dated Apr. 23, 2014.
Advisory Action from U.S. Appl. No. 13/464,230, dated Jul. 30, 2014.
Bierner, G., U.S. Appl. No. 13/464,252, filed May 4, 2012.
Non-Final Office Action from U.S. Appl. No. 13/464,252, dated Jun. 11, 2014.
Bierner et al., U.S. Appl. No. 13/464,269, filed May 4, 2012.
Non-Final Office Action from U.S. Appl. No. 13/464,269, dated Apr. 25, 2014.
Bierner et al., U.S. Appl. No. 13/464,287, filed May 4, 2012.
Non-Final Office Action from U.S. Appl. No. 13/464,287, dated Jul. 10, 2014.
Palombo, G., U.S. Appl. No. 13/741,287, filed Jan. 14, 2013.
Non-Final Office Action from U.S. Appl. No. 13/741,287, dated Dec. 29, 2014.
Zadeh et al., U.S. Appl. No. 13/946,984, filed Jul. 19, 2013.
Bierner, G., U.S. Appl. No. 13/946,986, filed Jul. 19, 2013.
Porter et al., U.S. Appl. No. 14/176,007, filed Feb. 7, 2014.
Just Answer, Terms of Service, 2004-2005 JustAnswer! pp. 1-12 http://web.archive.org/web/20080509130156/http://www.justanswer.com/tos.aspx.
Just Answer, Expert FAQ'S, 2004-2005 JustAnswer! pp. 1 http://web.archive.org/web/20070208193005/http://www.justanswer.com/help_expert.aspx.
Just Answer, Ask a Question, 2004-2005 Just Answer! pp. 1-2 http://web.archive.org/web/20080720171326/http://justanswer.com.
Just Answer, Expert Agreement, 2004-2005 JustAnswer! pp. 1-3 http://web.archive.org/web/20051127005457/http://www.justanswer.com/sa.asp.
International Preliminary Examination Report from International Application No. PCT/US2010/045232, dated Oct. 21, 2011.
International Search Report and Written Opinion from International Application No. PCT/US2010/045232, dated Oct. 1, 2010.
Supplementary European Search Report from EP Application No. 10808717.2, dated Jan. 21, 2014.
Coutu, A., "Consultation Fee Rates—Consultant Fees," Consultant Journal, May 26, 2006, pp. 1-5.
Phillips, M., "Get Expert Answers with JustAnswer," WebsiteMagazine.com, Aug. 29, 2008, pp. 1-2.
Huntington, D.; "Expert Systems for Online Advice: Knowledge at Your Fingertips," PCAI, Jul./Aug. 2000, pp. 26-27 and 49-50.
Muller et al., "Electronic Marketplaces of Knowledge: Characteristics and Sharing of Knowledge Assets," Proceedings of the International Conference on Advances in Infrastructure for e-Business, e-Education, e-Science, and e-Medicine on the Internet, Jan. 2002, pp. 1-12.
Non-Final Office Action from U.S. Appl. No. 13/464,252, dated Jan. 14, 2015.
Non-Final Office Action from U.S. Appl. No. 13/464,269, dated Jan. 26, 2015.
Non-Final Office Action from U.S. Appl. No. 13/464,287, dated Jan. 29, 2015.
Non-Final Office Action from U.S. Appl. No. 13/946,986, dated Apr. 3, 2015.
Non-Final Office Action from U.S. Appl. No. 14/176,007, dated Apr. 7, 2015.
Kurtzig et al., U.S. Appl. No. 12/854,836, filed Aug. 11, 2010.
Non-Final Office Action from U.S. Appl. No. 12/854,836, dated Jul. 18, 2012.
Kurtzig et al., U.S. Appl. No. 12/854,849, filed Aug. 11, 2010.
Non-Final Office Action from U.S. Appl. No. 12/854,849, dated Jun. 26, 2012.
Kurtzig et al., U.S. Appl. No. 13/439,743, filed Apr. 4, 2012.
Non-Final Office Action from U.S. Appl. No. 13/439,743, dated Jun. 28, 2012.

(56) References Cited

OTHER PUBLICATIONS

Final Office Action from U.S. Appl. No. 13/439,743, dated Mar. 27, 2013.
Non-Final Office Action from U.S. Appl. No. 13/439,743, dated Dec. 5, 2012.
Non-Final Office Action from U.S. Appl. No. 12/854,846, dated Feb. 13, 2014.
Notice of Acceptance from AU Application No. 2010282516 dated Jan. 31, 2014.
Just Answer, Help, 2004-2005 Just Answer! pp. 1-10 https://web.archive.org/web/20050828022539/http://www.justanswer.com/help.asp#FAQ54.
Yang et al., "Analyzing and Predicting Not-Answered Questions in Community-Based Question Answering Services," Proceedings of the Twenty-Fifth AAAI Conference on Artificial Intelligence, 2011, pp. 1273-1278.
Raben, D.R., "Self-Presentation and the Value of Information in Q&A Websites," Wiley INterscience, Aug. 7, 2009, pp. 2465-2473.
Liu et al., "You've got answers: Towards personalized models for predictingsuccess in community question answering," In Proceedings of the 46th Annual Meeting of the Association for Computational Linguistics (ACL), 2008, pp. 97-100.
Dror et al., "Will My Question be Answered? Predictiong "Question-Answerability" in Community Question-Answering Sites," Yahoo Labs, 2013, pp. 1-16.
Broder et al., "Syntatic Clustering of the Web," SRC Technical Note, Jul. 25, 1997, pp. 1-13.
Gharehchopogh et al., "Machine Learing based Question Classification Methods in Question Answering Systems," International Journal of Innovation and Applied Studies, vol. 4, No. 2, Oct. 2013, pp. 264-273.
Wei, L., "Question Classificaiton Using Language Modeling," CIIR Technical Report: University of Massachusetts, 2002, pp. 1-7.
Zhang et al., "Question Classification using Support Vector Machines", SIGIR, 2003, pp. 1-7.
Hermajakob, U., "Parsing and Question Classification for Question Answering", 2001, Proceedings of the Workshop on Open-Domain Question Answering at ACL, pp. 1-6.
Radev et al., "Probabilistic Question Answering on the Web," 2002, pp. 408-419.
Notice of Allowance from U.S. Appl. No. 13/464,287, dated Oct. 19, 2015.
Final Office Action from U.S. Appl. No. 13/464,230, dated Jan. 14, 2016.
Non-Final Office Action from U.S. Appl. No. 13/946,984, dated Jun. 1, 2016.

* cited by examiner

METHOD AND APPARATUS FOR AUTOMATED SELECTION OF INTERESTING CONTENT FOR PRESENTATION TO FIRST TIME VISITORS OF A WEBSITE

RELATED APPLICATIONS

The present application is a continuation-in-part application of U.S. patent application Ser. No. 13/464,230 filed on May 4, 2012, which is incorporated herein by reference.

FIELD

The present application relates generally to the field of computer technology and, in specific exemplary embodiments, to methods and systems for automatically identifying website content that may be interesting visitors of a website in the absence of any information on the visitors' interest or preferences.

BACKGROUND

Various techniques are employed by website operators to attract Internet users to their websites. One example of such a technique includes using search engine optimization to allow the website content to be ranked higher in search results presented by search engines. Various advertising such pay per click (PPC) advertising may also be used to bring users to a website. Once the user lands on a website, the next issue becomes how immediately engage the user with the website by presenting him or her with interesting content that would cause the user to remain on the site and begin to explore the site. However, in many cases, the website operator does not have any information about the user's preferences and interests because the user is a first time visitor to the website. Therefore, a solution that would engage first time visitors to a website by identifying and presenting interesting content to first time visitors is highly desirable.

BRIEF DESCRIPTION OF DRAWINGS

The appended drawings are merely used to illustrate exemplary embodiments of the present invention and cannot be considered as limiting its scope.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on quality control of experts, the embodiments are given merely for clarity and disclosure. Alternative embodiments may employ other systems and methods and are considered as being within the scope of the present invention.

Embodiments of the present invention provide systems and methods for identifying and presenting interesting content to visitors of a website with the goal of immediately engaging such visitors to a website. In exemplary embodiments of the present invention, the parameters used to identify the interesting content within the website are independent of the visitors' preferences and therefore even first time visitors to a website may be provided with interesting content that may engage them with the website.

Embodiments of the present invention further provide systems and methods for automatically identifying and presenting interesting content is partially based on the density of topics that appear in more than one subject categories.

In alternative embodiments, interesting content identification is at least partially based on the absolute topic density. In yet other embodiments of the present invention, the interesting content identification is partially based on the "readability" of the content. Readability of contents varies based on factors such as good sentence structure, long sentence lengths, etc.

In yet other embodiments of the present invention, the content "interestingness" value is calculated based on a weighted average of multiple factors including at least inter-category topic density, absolute topic density, and content readability.

Figure 1:
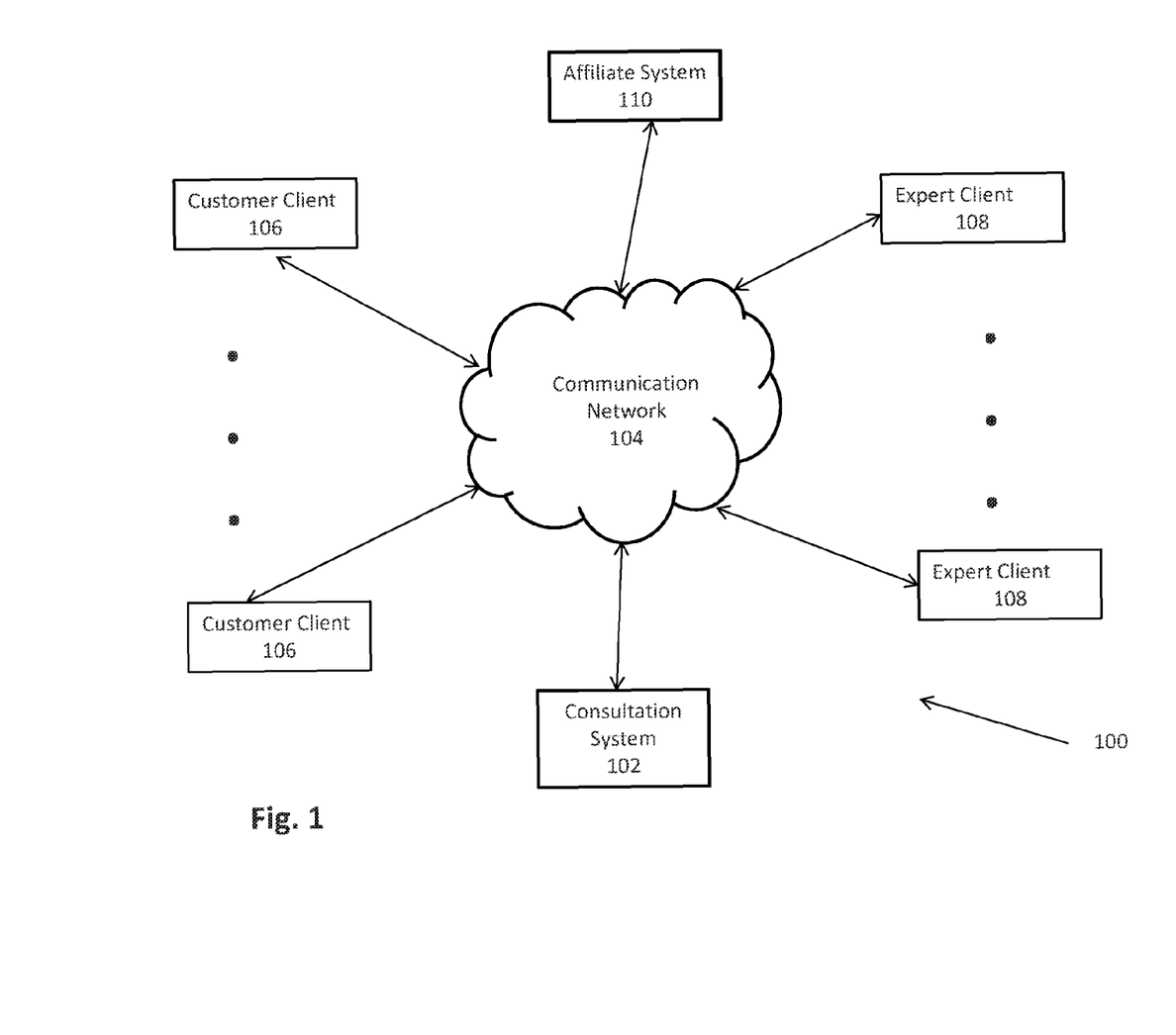
FIG. 1 is a diagram of an exemplary environment in which embodiments of the present invention may be practiced.

FIG. 1 shows an exemplary environment 100 of an online consultation website and system in which embodiments of the present invention may be practiced. The exemplary environment 100 comprises a consultation system 102 coupled via, a communications network 104 to one or more customer clients (also referred to as the user clients 106 hereafter) and expert clients 108. The communication network 104 may comprise one or more local area networks or wide area networks such as, for example, the Internet and telephone systems.

In exemplary embodiments, the consultation system 102 provides a forum where users may post or pose questions for which experts may provide answers. The consultation system 102 may provide the forum via a website. In some embodiments, at least portions of the forum (e.g., asking of questions or receiving of responses) may occur via the website, mobile phone, other websites, text messaging, telephone, video, VoIP, or other computer software applications. Because the consultation system 102 is network based e.g., Internet, public switched telephone network (PSTN), cellular network, the users using the consultation system 102 and experts providing answers may be geographically dispersed (e.g., may be located anywhere in the world). As a result an expert may provide answers to a user thousands of miles away. Additionally, the consultation system 102 allows a large number of users and experts to exchange information at the same time and at any time.

By using embodiments of the present invention, a user posting a question may easily obtain a tailored answer. Accordingly, one or more of the methodologies discussed herein may obviate a need for additional searching for answers, which may have the technical effect of reducing computing resources used by one or more devices within the system. Examples of such computing resources include, without limitation, processor cycles, network traffic, memory usage, storage space, and power consumption.

In various embodiments, a user may pose a question and one or more experts may provide answers. In various embodiments, the question may be matched with a category of experts, more specific set of experts, or even individual experts, sometimes on a rotating basis by user selection, a keyword based algorithm, a quality based algorithm (or score or rating), or other sorting mechanism that may include considerations such as, for example, likely location or time zone. A back-and-forth communication can occur. Part of the back-and-forth communication may be the experts asking the users to supplement their question with necessary missing details that would help the expert provide a satisfactory answer. Embodiments of the present invention may eliminate the need for experts to have to spend time and effort to solicit from the users, missing question details. In various embodiment of the present invention, the consultation system 102 will automatically identify question details embedded in the submitted question and will attempt to either automatically confirm the embedded question details or solicit the details from the user in case the relevant details were not provided.

The user may accept an answer provided by one or more of the experts. In an alternative embodiment, the user may be deemed to have accepted the answer if the user does not reject it. By accepting the answer, the user validates the expert's answer which, in turn, may boost a score or rating associated with the expert. The user may also pay the expert for any accepted answers and may add a bonus. The user may also leave positive, neutral or negative feedback regarding the expert. More details regarding the consultation system 102 and its example functions will be discussed in connection with FIG. 2 below.

The exemplary user client 106 is a device associated with a user accessing the consultation system 102 (e.g., via a website, telephone number, text message identifier, or other contact means associated with the consultation system 102). The user may comprise any individual who has a question or is interested in finding answers to previously asked questions. The user client 106 comprises a computing device (e.g., laptop, PDA, cellular phone) which has communication network access ability. For example, the user client 106 may be a desktop computer initiating a browser for access to information on the communication network 104. The user client 106 may also be associated with other devices for communication such as a telephone.

In exemplary embodiments, the expert client 108 is a device associated with an expert. The expert, by definition, may be any person that has, or entity whose members have, knowledge and appropriate qualifications relating to a particular subject matter. Some examples of expert subject matters include health (e.g., dental), medical (e.g., eye or pediatrics), legal employment, intellectual property, or personal injury law), car, tax, computer, electronics, parenting, relationships, and so forth. Almost any subject matter that may be of interest to a user for which an expert has knowledge and appropriate qualifications may be contemplated. The expert may, but does not necessarily need to, have a license, certification or degree in a particular subject matter. For example, a car expert may have practical experience working the past 20 years at a car repair shop. In some embodiments, the expert may be a user (e.g., the expert posts a question).

The expert client 108 may comprise a computing device (e.g., laptop, PDA, cellular phone) which has communication network access ability. For example, the expert client 108 may be a desktop computer initiating a browser to exchange information via the communication network 104 with the consultation system 102. The expert client 108 may also be associated with other devices for communication such as a telephone.

In accordance with one embodiment, an affiliate system 110 may be provided in the exemplary environment 100. The affiliate system 110 may comprise an affiliate website or other portal which may include some of the components of the consultation system 102 or direct their users to the consultation system 102. For example, the affiliate system 110 may provide a website for a car group. A link or question box may be provided on the affiliate website to allow members of the car group to ask questions. The environment 100 of FIG. 1 is exemplary. Alternative embodiments may comprise any number of consultation systems 102, user clients 106, expert clients 108, and affiliate systems 110 coupled together via any type of one or more communication networks 104, and still be within the scope of exemplary embodiments of the present invention. For example, while only one consultation system 102 is shown in the environment 100, alternative embodiments may comprise more than one consultation system 102. For instance, the consultation systems 102 may be regionally established.

The U.S. patent application Ser. No. 113/464,269, entitled "Method And Apparatus For identifying And Eliciting Missing Question Details In A Consultation System" is the parent application to the present application and describes in detail the system and methods for identifying missing details in questions posted by users to the exemplary online consultation system of the present invention. Embodiments of the present invention provide for system and methods that provide improvement over the parent application by providing the ability for on-the-fly question detail extraction and topic category suggestion.

Figure 2:
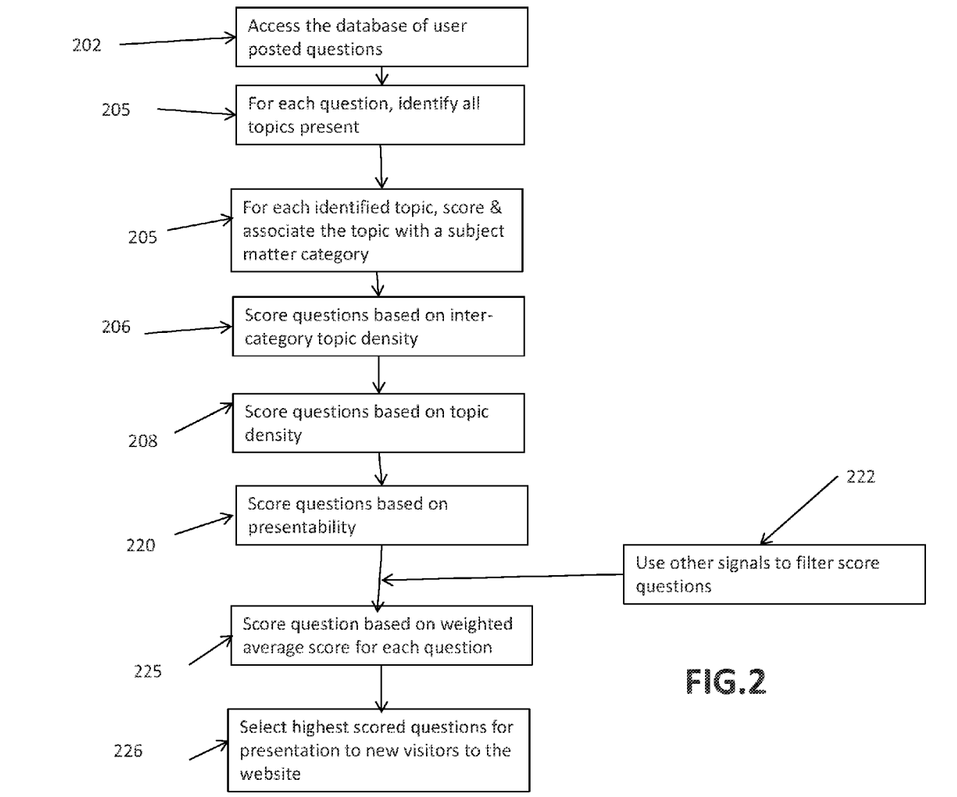
FIG. 2 shows an exemplary flowchart of a method for identifying interesting content.

FIG. 2 shows an exemplary flowchart of a method for identifying interesting content. In the following description, for purposes of illustration, the application of the system and methods of the present invention as applied to an online consultation system 100 is described. It would be apparent to one of skill in the art that the systems and methods of the present invention may be applied to any content. In the exemplary embodiment of the online consultation system 100, user posted questions are selected as the content to be analyzed. The online consultation system 100 is described in details in the U.S. patent application Ser. No. 13/464,230, entitled "Method and Apparatus For Identifying Similar Questions In A Consultation System", filed on "May 4, 2012, including Edwin Cooper as common inventor. Numerous specific details are set forth in order to provide an understanding of various embodiments of the inventive subject matter as applied to the illustrative example of an online consultation system 100. However, it will be evident, to those skilled in the art that embodiments of the inventive subject matter may be practiced without these specific details and the inventive elements of the present invention are not limited to the illustrative example described below.

Returning now to FIG. 2, in operation 202, the database of archived questions and answers of the online consultation system 100 is accessed to retrieve the stored question and answer threads. Archived questions have previously been submitted by users who are seeking answers from subject matter experts in particular topic categories. An exemplary online consultation system 100 may include tens or hundreds of topic categories where multiple experts are available to provide answers to user posted questions. Experts may provide answers for free or for a fee.

The table I below includes a few examples of user submitted questions.

| Question | Number of topics covered | Number of cross-category topics covered |
|---|---|---|
| 1- My 2002 Chevy Malibu does not start, I have recently changed the starter, oil filter and battery . . . What may be wrong with it? | 5 | 0 |
| 2-My 2002 Chevy Malibu does not start The exhaust smells like a skunk died in there. I suspect that a rat may have lodged itself in the exhaust pipe and now I cannot start my car. . . | 8 | 3 |
| 3- My 7 year old son caught a black spider but while he was in my 2002 Chevy Malibu, the spider bit him and escaped in through the air condition vent. Now, a month later, baby spiders keep flying out of the air condition system, I do not know what to do to get rid of them. I do not know whether these spiders are baby "black widow" spiders and are poisonous, Please help. | 8 | 4 |

As seen from the sample questions, each question may cover one or more topics and will be posted to either a user selected topic category or a category automatically selected by the consultation system 100. The U.S. patent application Ser. No. 13/464,167, entitled "Method and Apparatus for Automated Topic Extraction Used For The Creation And Promotion Of New Categories In A Consultation System" filed on May 4, 2012, now U.S. Pat. No. 8,463,648, discloses a system and method of automatically extracting subject matter topics from text, and in the case of the exemplary consultation system 100, extracting topics from user posted questions. In reviewing exemplary question number three from the above table, the topics covered by the question include, "2002 Chevy Malibu" and "air condition vent" in the car category and more specifically in "automotive repair" category, "my son" in the car and possibly medical category, and more specifically "pediatric medicine," "black spider" in car category, animal category and pest control. So, question number three has by one count eight topics in total and at least three cross-category topics. Similarly question number two includes eight topics with three cross-category topics. However, question number one has five topics and zero cross-category topics.

Returning now to the FIG. 2, in operation 204, all topics present in each question are identified for each posted question. In operation 205, each identified topic is scored and associated with a subject matter category. In exemplary embodiments of the present invention, the topic identification and scoring is done according to system and methods described in Method and Apparatus for Automated Topic Extraction Used For The Creation And Promotion Of New Categories In A Consultation System Of Topic Extraction" which is related to the present invention. So, for each question, the output of operations 204 & 205 yields at least one topic, a category with which the topic is associated, and a score corresponding to the identified topic. Topics extraction is described in detail in the U.S. patent application "Method and Apparatus for Automated Topic Extraction Used For The Creation And Promotion Of New Categories In A Consultation System". However, a brief description of the process is present herein below. The process begins by selecting a set of questions, wherein each question includes metadata associating it with a given subject matter category or segment. All topics present in each and every question (also referred to as candidate topics at this stage) are extracted from the questions. For each subject matter category, the number of occurrence of a candidate topic within that category is counted. In the next operation, certain logical conditions are used to filter candidate topics.

The filtered topics are then scored. In exemplary embodiments of the present invention, topic scoring may use a modified TFIDF methodology. The topics with highest score associated with that subject matter category are identified as the best topics for that subject matter category.

In operation 206, an inter-category topic density value is calculated for each question. The inter-category topic density is calculated for each question by identifying the number cross-category topics included in the question. As previously discussed, in the example questions above, questions two and three each may have an inter-category topic density value of three (3) (e.g. question #3 includes topics related to: cars, car repair, spiders, medical, etc.), and question number one will have an inter-category topic density of zero (0) associated with it.

In the context of the present invention, relatively speaking, questions/contents that include a higher density of inter-category topics are assumed to be more interesting. This assumption is reasonable and likely to yield the good results because content including higher inter-category topics density s more likely to relate to unique or special issues and therefore more likely to be interesting to the broadest group of people, regardless of each person's specific interest. Since very' little to no information is known about the likes and dislikes of a first time visitor to a website, the "interestingness" of a question should be measured based on parameters independent of the visitors likes and dislikes, and mainly dependent of the inherent properties of the content. The term "interestingness" as used in this specification refers to a question's attractiveness to a reader/user. In the case of a new visitor to a website, interestingness of the content has to be mostly based on factors intrinsic to the content. So, in the case of the exemplary questions in table I, question 3 is presumed to be relatively more interesting because it includes an inter-category topic density 4. Question number two with an inter-category topic density of 3 is presumed to be more interesting than question one with an inter-category topic density of zero. In reality, question 3 and 2 are both interesting, because they include unusual occurrences and therefore they are more likely to attract and keep a visitor's interest, similar to other content such as the news or a movie, where unusual subject matters are more interesting.

In operation 208, for each question, a total topic density value is calculated. In this case, the total topic density counts all topics found M a content including but not limited to inter-category topic. Similarly to operation 206, it is presumed that all other things being equal, the interestingness score of a question is higher when the question relates to more topics and thus has a higher topic density. In the example of the questions in table I, questions 2 and 3 each include eight topics and are thus presumed to be more interesting than question I including only five topics.

In operation 210, for each question, a "readability" or "presentability" score is calculated. The question "readability" score may be based on multiple parameters and reflects the readability and the ease of comprehension by a typical user. For example, it is presumed that contents with fewer grammatical errors and a minimum text length are more readable, easier to understand and therefore more appropriate content to be presented to a first time visitor as examples of interesting questions. The readability score details are further discussed in relation to FIG. 4.

In operation 212, additional inputs may be considered in computing an overall "interestingness" score for a question/content. If the visitor to the online consultation system 100 is not a first time visitor, there may be information available about him that could identify his interest based on for example his previous browsing habit, including what he clicked on, how long he spent reading a particular web page or content, and whether the user converted from a visitor to a paid user of the system by submitting a question for an expert. These additional inputs may be used to further refine or filter the types of questions that may be used in the interestingness analysis for the returning visitor, In exemplary embodiments of the present invention, users may land on the online consultation system 100 through Search Engine Optimization (SEO) Pay Per Click (PPC) advertising. In either SEO or PPC advertising, information related to the search or the PPC link that brought the user to the online consultation system 100 may be incorporated in the interestingness score or be used as a filter to limit the set of topics that may be of interest to a particular user. In operation 214, a total interestingness score is computed for each question. In exemplary embodiments of the present invention, the interestingness score is calculated as a weighted average of the inter-category topic score, the absolute topic score, the question presentability score, and any other input signal that may be available and relevant. It would be apparent to one of skill in the art, that the weighted average may be adjusted to apportion a greater weight to parameters that are considered more important and less weight to parameters that are considered less important.

In operation 216, the questions with the highest interestingness scores are identified as the questions that are most likely to attract the interest of generic users solely based on properties inherent to the content. In the case of a first time visitor to the online consultation system 100, very little may be known about the visitor's preferences and interests. Therefore, one exemplary application of embodiments of the present invention may be in identifying questions or content with highest interestingness score to be presented to first time visitors where little is known about the visitor.

Once the presentability score, topic density score, and inter-category topic density score are calculated for each question, the questions with the highest overall scores are selected for presentation to the visitors. In alternative embodiments of the present invention, other factors such link analysis, what topic or topics brought the user to the website, previous users conversion rate, interest, time users spent on reading a content, etc, may be used to filter the questions selected for presentation, to further reflect possible user preferences. Once the questions with the highest interestingness score are identified, they are presented to the visitors of the online consultation system 100.

Figure 3:
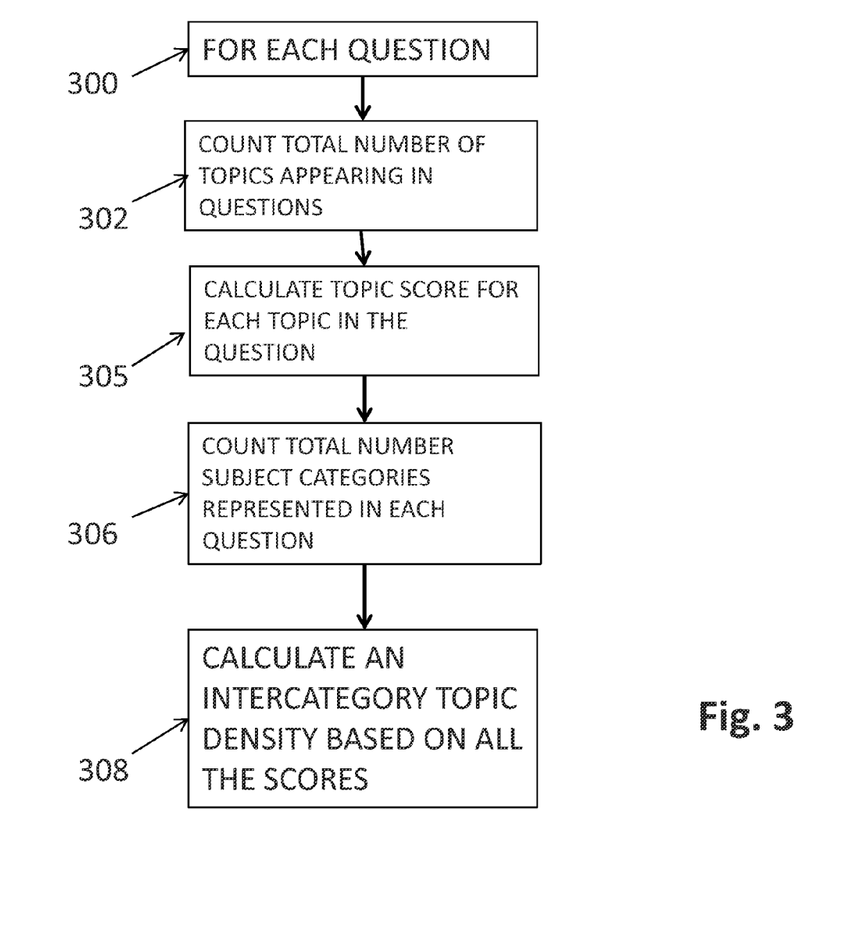
FIG. 3 shows an exemplary flowchart of a method for scoring questions based on inter-category topic density.

FIG. 3 shows an exemplary flowchart of a method of calculating an inter-category topic density score for the content under analysis. With reference to FIG. 3, in operation 300, a question is selected. In operation 302, for each selected question, each topic appearing in the question is identified and counted. In operation 304, a topic score is calculated for each topic identified in the question. In operation 306, the total number of categories represented in each question is counted. Lastly, in operation 308, for each question, an inter-category topic score is calculated based on a weighted average of the total number of topic scores, the total number of topics, and the total number of categories represented in each question. So for example, a question with a high inter-category topic score will be a question with a high number of topics, a high number of topic categories present, including a large number topics with a high topic score. It would be apparent to one of skill in the art that the weighting of the various parameters in the weighted average may be adjusted based on the determination of which parameters are most important to the question interest score in the particular application or implementation of the present invention. In one exemplary embodiment of the present invention, the weighted average calculations are performed on normalized parameters. Each parameter is normalized by dividing the parameter value by the maximum range of values for that parameter. A logarithmic normalization is then performed to limit the values between zero and one. Thus, each parameter values will have the same significance or weight associated with it.

Figure 4:
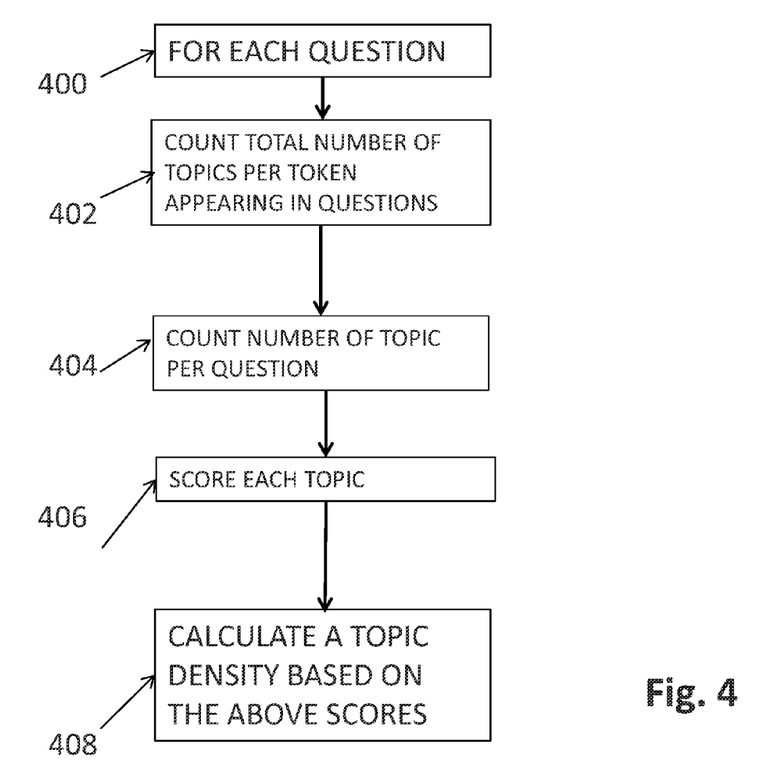
FIG. 4 shows an exemplary flowchart of a method for scoring s questions based on topic density.

FIG. 4 shows an exemplary flowchart of a method of scoring a question based on topic density. In operation 402, for each question, the number of topics per token present in that question is counted. A high number of topics per token may be used as one measure of topic clarity and coherence. Content with higher number of topics per token are considered to be more dense with information and thus more coherent or clear. In operation 404, the number of topics per the question is counted. Lastly, in operation 406, for each topic present in the question, the topic score is retrieved. The highest topic count for each question is computed based on the number of topics per token, the number of topics in the question and the topic score for each topic present in the question. A high question topic score may be the result of a high number of topics per token count, a high number of topics per the question and a high topic score. Finally, in operation 408, for each question, a topic density is calculated based on the above described factors.

Figure 5:
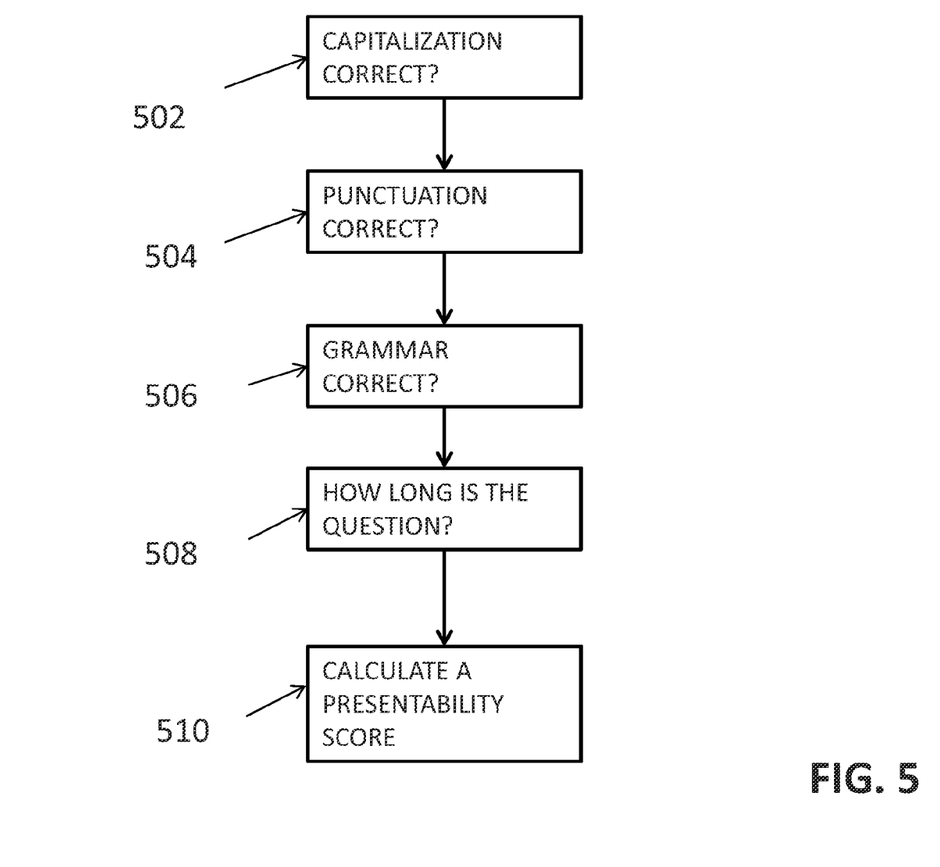
FIG. 5 shows an exemplary flowchart of a method for scoring a content based on presentability/readability.

FIG. 5 shows an exemplary flowchart of a method for scoring the content under analysis based on presentability or readability. The presentability score for each question may be based on many factors. In exemplary embodiments of the present invention, proper capitalization, the number of grammatical errors, the use of correct punctuation, and the length of the display window are all factors that may affect readability of the content under analysis and thus considered in calculating the presentability score. In operation 502, correct capitalization of the content is calculated is computed. For example, if a question is written in all caps, it would be considered bad form and thus not as presentable as a question that is properly capitalized. Therefore, a text in all caps will receive a low score corresponding to improper capitalization. In operation 504, a proper punctuation score is computed. In operation 506, a score based on the proper use of grammar is computed.

In operation 508, a score based on the length of the question compared to the length of the display window is computed. The length of the display window may be important because if the question needs to be cut off to fit the display window, the displayed portion of the question may not be easily comprehensible. Ideally, the length of the text to be displayed should be exactly the same as the display window. Shorter questions are less desirable because they have less content, but a short question can be fully displayed and therefore it is more desirable than a longer question. Therefore, in alternative embodiments, a penalty may be associated with the questions that are too long or too short. In one exemplary embodiment, under length questions may be penalized with factor of one for each character less than the display window length. Longer questions may be penalized with a factor or 5 or 10, for each character over the display window length. This weighting factor favors questions that have a character length that is exactly that of the display window length or slightly shorter. Questions that are much longer than the display window length are heavily penalized. As previously discussed, longer questions are more likely to be cut off in a manner that makes them incomprehensible. In alternative embodiments, the question length penalization is less heavily weighted because the user may scroll through the lengthy content and view the entire question despite its length.

In operation 510, a presentability score is computed that is a sum of the capitalization score, punctuation score, grammar score, and character length compared to display window size.

Once the presentability score, topic density score, and intercategory topic density score are calculated for each question, the questions with the highest overall scores are selected for presentation to the visitors. In alternative embodiments of the present invention, other factors such link analysis, what topic or topics brought the user to the website, previous users conversion rate, interest, time users spent on reading a content, etc, may be used to filter the questions selected for presentation, to further reflect possible user preferences.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module or engine should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 6:
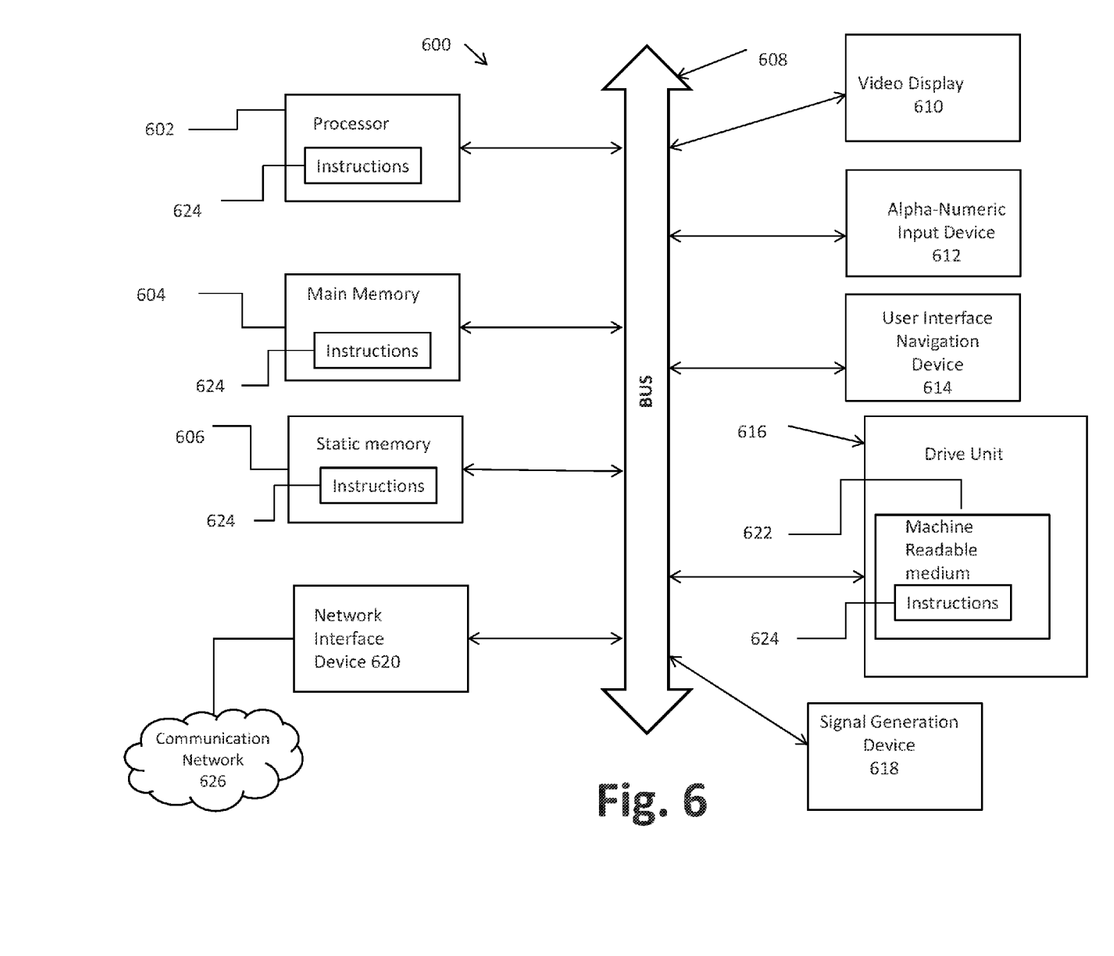
FIG. 6 shows a simplified block diagram of a digital device within which a set of instructions, for causing the machine to perform any one or more of the methodologies discussed herein, may be executed.

With reference to FIG. 6, an exemplary embodiment extends to a machine in the exemplary form of a computer system 600 within which instructions for causing the machine to perform any one or more of the methodologies discussed herein may be executed. In exemplary embodiments, the computer system 600 may be any one or more of the user client 106, the expert client 108, affiliate system 110, and servers of the consultation system 102. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)), in exemplary embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

Machine-Readable Medium

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable medium 622 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term "machine-readable medium" shall also be taken to include any non-transitory storage medium.

Transmission Medium

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer implemented method, comprising:
   selecting a content item from a plurality of content that is candidate for presentation to first time visitors of a website;
   identifying all topics present in the selected content item;
   scoring each identified topic;
   associating each scored topic with at least one subject matter category;
   calculating a first score associated with the selected content item based on an intercategory topic density determined for the selected content item;
   calculating a second score associated with the selected content item based on a topic density determined for the selected content item;
   calculating a third score associated with the selected content item based on a presentability of the selected content item;
   calculating a weighted average of the first, second and third score to compute an interestingness score for the selected content item; and
   presenting the selected content item to the first time visitors of the website when it is determined that the interestingness score calculated for the selected content item is greater than a threshold.

2. The method of claim 1, wherein computing the interestingness score includes an analysis of information about the first time visitors.

3. The method of claim 2, wherein the information includes a browser type of the first time visitors, a physical location of the first time visitors, and information about how the first time visitors landed on the website.

4. The method of claim 1, wherein calculating the first, second, and third scores is based on an importance measure.

5. The method of claim 4, wherein the scoring uses a modified TFIDF methodology.

6. The method of claim 1, wherein the scored topics are filtered based on logical conditions such as how often each topic appears in a subject category.

7. A non-transitory machine-readable storage medium having embodied thereon instructions which when executed by at least one processor, causes a machine to perform a method comprising:
   selecting a content item from a plurality of content that is candidate for presentation to first time visitors of a website;
   identifying all topics present in the selected content item;
   scoring each identified topic;
   associating each scored topic with at least one subject matter category;
   calculating a first score associated with the selected content item based on an intercategory topic density determined for the selected content item;
   calculating a second score associated with the selected content item based on a topic density determined for the selected content item;
   calculating a third score associated with the selected content item based on a presentability of the selected content item;
   calculating a weighted average of the first, second and third score to compute an interestingness score for the selected content item; and
   presenting the selected content item to the first time visitors of the website when it is determined that the interestingness score calculated for the selected content item is greater than a threshold.

8. An apparatus, including
   a processor, memory connected to the processor; and
   instructions stored on the memory, that when executed by the processor, perform the following:
   selecting a content item from a plurality of content that is candidate for presentation to first time visitors of a website;
   identifying all topics present in the selected content item;
   scoring each identified topic;
   associating each scored topic with at least one subject matter category;
   calculating a first score associated with the selected content item based on an intercategory topic density determined for the selected content item;
   calculating a second score associated with the selected content item based on a topic density determined for the selected content item;
   calculating a third score associated with the selected content item based on a presentability of the selected content item;
   calculating a weighted average of the first, second and third score to compute an interestingness score for the selected content item; and
   presenting the selected content item to the first time visitors of the website when it is determined that the interestingness score calculated for the selected content item is greater than a threshold.

9. The method of claim 1, wherein calculating the first score includes identifying a number of topics present within the selected content item that are each associated with a plurality of subject matter categories.

10. The method of claim 1, wherein calculating the second score includes identifying a total number of topics present within the selected content item.

11. The method of claim 1, wherein the third score is calculated for the selected content item based on a capitalization of words within the selected content item, a number of grammatical errors within the selected content item, a use of correct punctuation within the selected content item, a length of a display window associated with the selected content item, and a length of the selected content item compared to the length of the display window associated with the selected content item.

12. The method of claim 11, wherein the third score is reduced when it is determined that the length of the selected content item is shorter or longer than the length of the display window.

13. The method of claim 12, wherein the third score is reduced by a first amount when it is determined that the length of the selected content item is shorter than the length of the display window, and is reduced by a second amount greater than the first amount when it is determined that the length of the selected content item is longer than the length of the display window.

* * * * *